United States Patent
Hrovat et al.

(10) Patent No.: US 8,398,526 B2
(45) Date of Patent: Mar. 19, 2013

(54) VEHICLE LAUNCH USING A TRANSMISSION CLUTCH

(75) Inventors: Davor D. Hrovat, Ann Arbor, MI (US); Michael G. Fodor, Dearborn, MI (US); Hong Jiang, Canton, MI (US); Ian Oldknow, Herts (GB); Jahan Asgari, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 698 days.

(21) Appl. No.: 12/652,865

(22) Filed: Jan. 6, 2010

(65) Prior Publication Data

US 2010/0105523 A1    Apr. 29, 2010

Related U.S. Application Data

(63) Continuation-in-part of application No. 12/015,920, filed on Jan. 17, 2008, now Pat. No. 7,998,026.

(51) Int. Cl.
  *B60W 10/02* (2006.01)
  *B60W 10/04* (2006.01)
(52) U.S. Cl. .................... 477/180; 477/181
(58) Field of Classification Search ............ 477/180, 477/181
  See application file for complete search history.

(56) References Cited

U.S. PATENT DOCUMENTS

| | | | |
|---|---|---|---|
| 4,081,065 A | 3/1978 | Smyth et al. | |
| 4,091,902 A * | 5/1978 | Hamada | 477/89 |
| 4,576,263 A | 3/1986 | Lane et al. | |
| 4,620,624 A * | 11/1986 | Mitsui et al. | 477/176 |
| 4,715,467 A | 12/1987 | Sakai | |
| 4,723,644 A | 2/1988 | Sakakiyama | |
| 4,799,160 A * | 1/1989 | Arbeille et al. | 701/67 |
| 6,083,139 A | 7/2000 | Deguchi et al. | |
| 6,482,123 B2 | 11/2002 | Steeby | |
| 6,676,561 B2 | 1/2004 | Fritzer et al. | |
| 6,767,311 B2 | 7/2004 | Yoshikawa et al. | |
| 7,037,239 B2 | 5/2006 | Werner et al. | |
| 7,070,538 B2 | 7/2006 | Babcock | |
| 7,158,873 B2 | 1/2007 | Eich et al. | |
| 7,255,663 B2 | 8/2007 | Kawamoto et al. | |
| 7,628,728 B2 * | 12/2009 | Soliman et al. | 477/5 |
| 2005/0137058 A1 | 6/2005 | Fujimoto et al. | |
| 2006/0014608 A1 | 1/2006 | Mitchell et al. | |

* cited by examiner

*Primary Examiner* — Sherry Estremsky
(74) *Attorney, Agent, or Firm* — James Dottavio; MacMillian Sobanski & Todd LLC

(57) ABSTRACT

A method for controlling a transmission input clutch during a vehicle launch includes determining a desired clutch torque, a desired engine torque, a desired vehicle acceleration and a desired engine speed, determining a change in clutch torque and a change in engine torque with reference to the first and second errors and current operating conditions, applying to the clutch an updated clutch torque capacity whose magnitude is the sum of the desired clutch torque and the change in engine torque, and producing an updated engine torque whose magnitude is the sum of the desired engine torque and the change in engine torque.

13 Claims, 6 Drawing Sheets

VEHICLE LAUNCH USING A TRANSMISSION CLUTCH

This application is a continuation-in-part of pending U.S. application Ser. No. 12/015,920, filed Jan. 17, 2008.

BACKGROUND OF THE INVENTION

1. Field of the Invention

This invention relates generally to a vehicle powertrain having an input clutch. More particularly, the invention pertains to a method for controlling the clutch during a vehicle launch condition.

2. Description of the Prior Art

A vehicle launch is a low-speed drive-away event in which a vehicle with a transmission is accelerated in response to the vehicle operator depressing an accelerator pedal. When the vehicle powertrain is equipped with a conventional automatic transmission, launch behavior is largely regulated by the torque converter, which ultimately sets engine speed and wheel torque as a dynamic function of engine torque. In this conventional powertrain setting, the torque converter characteristics are first engineered to trade off fuel economy and driving performance, then engine pedal maps (the engine control software relationship between accelerator pedal position and engine torque) are tuned to provide the best vehicle feel for the given converter design.

Launch control is used to facilitate vehicle motion from standstill after the driver presses the gas pedal indicating his intention to initiate vehicle motion. In automatic transmissions the launch functionality is provided with a torque converter, which has inherent positive characteristics, such as torque multiplication at low speed ratio, characteristic of launch situations both on level roads and hills. A torque converter also provides hill holding capability. It provides a natural damping or filtering of any possible drivability and NVH-related disturbances that may occur due to jerky gas pedal motion caused by a driver's change-of-mind and similar actions. A torque converter, however, dissipates energy, reducing fuel economy, and imposes a space and weight penalty.

Due to these limitations, an emerging trend in automatic transmission design eliminates the torque converter and replaces it with appropriately controlled friction clutches. One such example is the so-called Powershift (PS) transmission, consisting of only two clutches (one for odd and one for even-numbered gears), synchronizers-like couplers, manual transmission-like gears, sensors and either electrical or electro-hydraulic actuation of the clutches and synchronizers.

Such transmissions offers a number of advantages including low parts count, simplicity, robustness of design, and substantial commonality with manual transmissions, thereby facilitating common production.

The Powershift transmission enables the use of algorithms that can control the clutch in ways more complex than the passive torque converter, eliminating or reducing some of the design tradeoffs inherent in the passive torque converter system. For example, the clutch can be fully opened when the driver presses the brake pedal, eliminating transmission drag on the idling engine, thereby improving fuel economy.

In the automatic clutch setting, the intent of the launch function is to provide a wheel torque that reflects driver demand from the accelerator pedal and provides an engine speed trajectory that meets the competing requirements of providing a "power-on" feel and sound to the driver while limiting clutch component wear associated with slip across the device.

A need exists in the industry for control of the input clutch such that robust, optimized performance is obtained.

SUMMARY OF THE INVENTION

A method for controlling a transmission input clutch during a vehicle launch includes determining a desired clutch torque, a desired engine torque, a desired vehicle acceleration and a desired engine speed, determining a change in clutch torque and a change in engine torque with reference to the first and second errors and current operating conditions, applying to the clutch an updated clutch torque capacity whose magnitude is the sum of the desired clutch torque and the change in clutch torque, and producing an updated engine torque whose magnitude is the sum of the desired engine torque and the change in engine torque.

The control produces vehicle behavior that is expected by drivers accustomed to a conventional automatic transmission, and provides a system tuning method similar to that used in a conventional transmission, allowing carryover of former engineering techniques and experience.

The control simplifies the design by eliminating the need for multiple tuned control loops with associated feedback measurement targets and the inherent difficulties of aligning those targets with engine torque.

The control method is insensitive to engine torque hesitation, engine torque errors with respect to driver demand, and clutch torque errors as compared to other control approaches.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
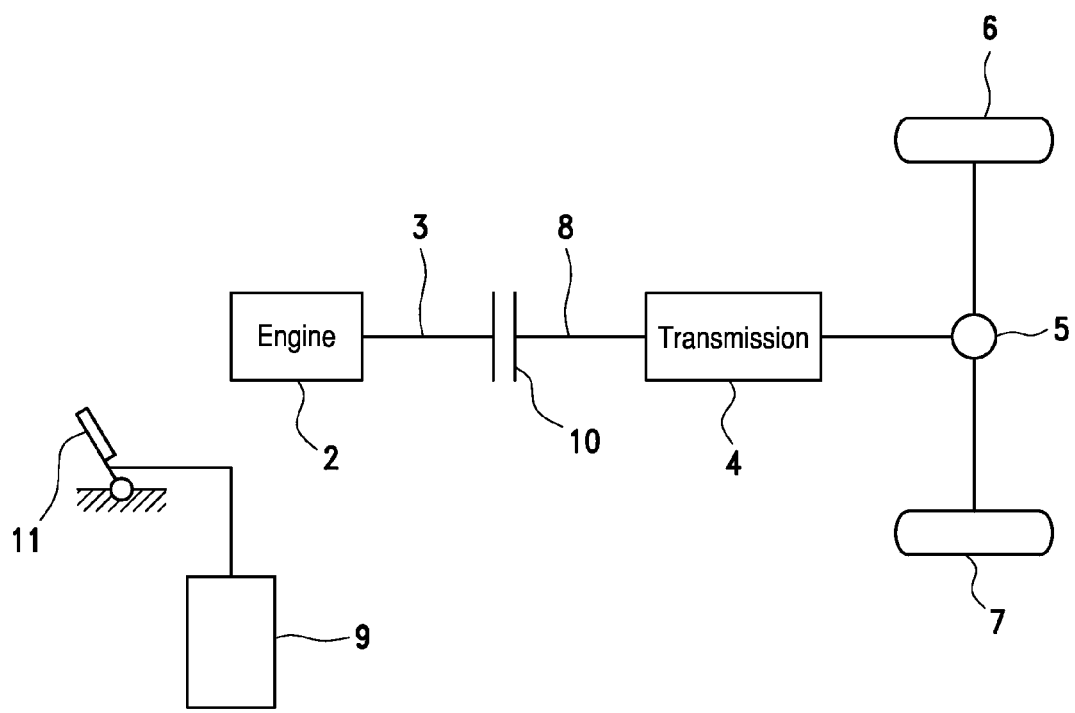
FIG. 1 is a schematic diagram showing a vehicle powertrain that uses a clutch to launch the vehicle.

Referring now to FIG. 1, a vehicle powertrain includes an engine 2, driveshaft 3, transmission 4, and differential mechanism 5 for transmitting transmission output torque differentially to the vehicle wheels 6 and 7. A friction clutch 10 having a variable torque transmitting capacity driveably connects engine 2 and a transmission input 8 when the clutch is fully engaged or closed, disconnects the engine and input 8 when the clutch is fully disengaged or open, and partially connects the engine and input 8 when the clutch is slipping. Clutch slip is the difference between the speed of driveshaft 3 and the speed of the transmission input 8.

To provide a vehicle launch behavior that is consistent with conventional transmissions, the clutch is controlled during the launch event such that it emulates the behavior of a passive transmission input device, such as a torque converter.

Figure 4:
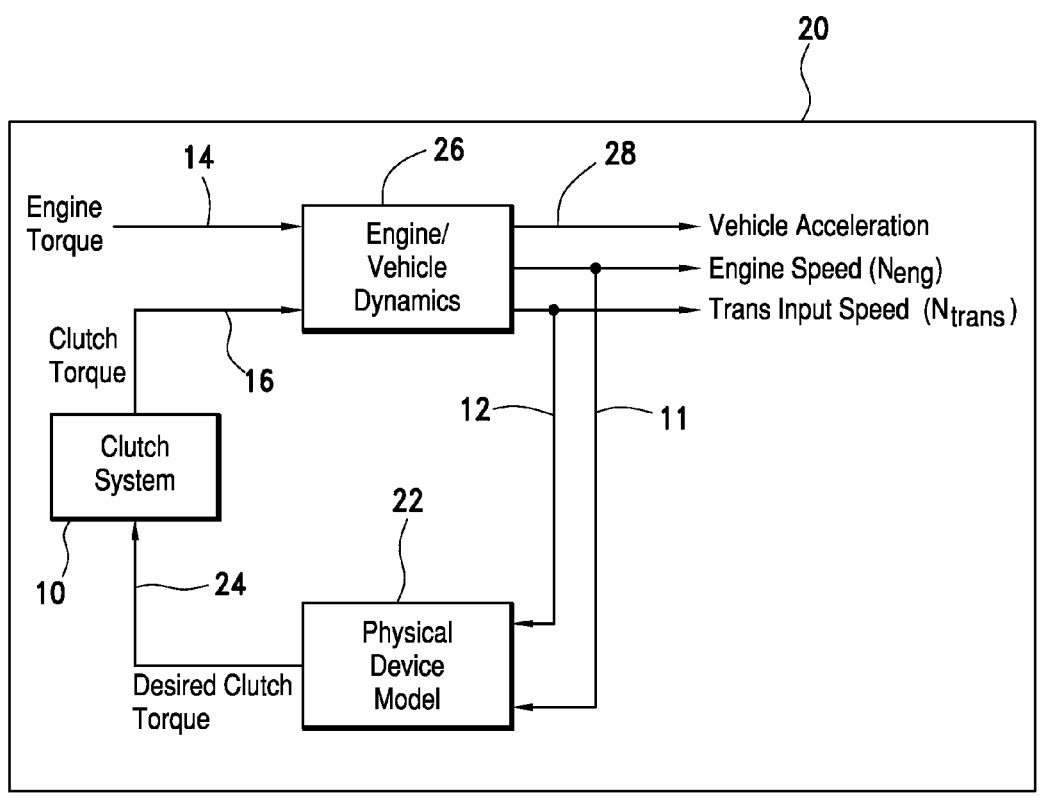
FIG. 4 is schematic block diagram of a control for emulating torque transmitting capacity of a transmission input device used in launch control of the vehicle.
Figure 5:
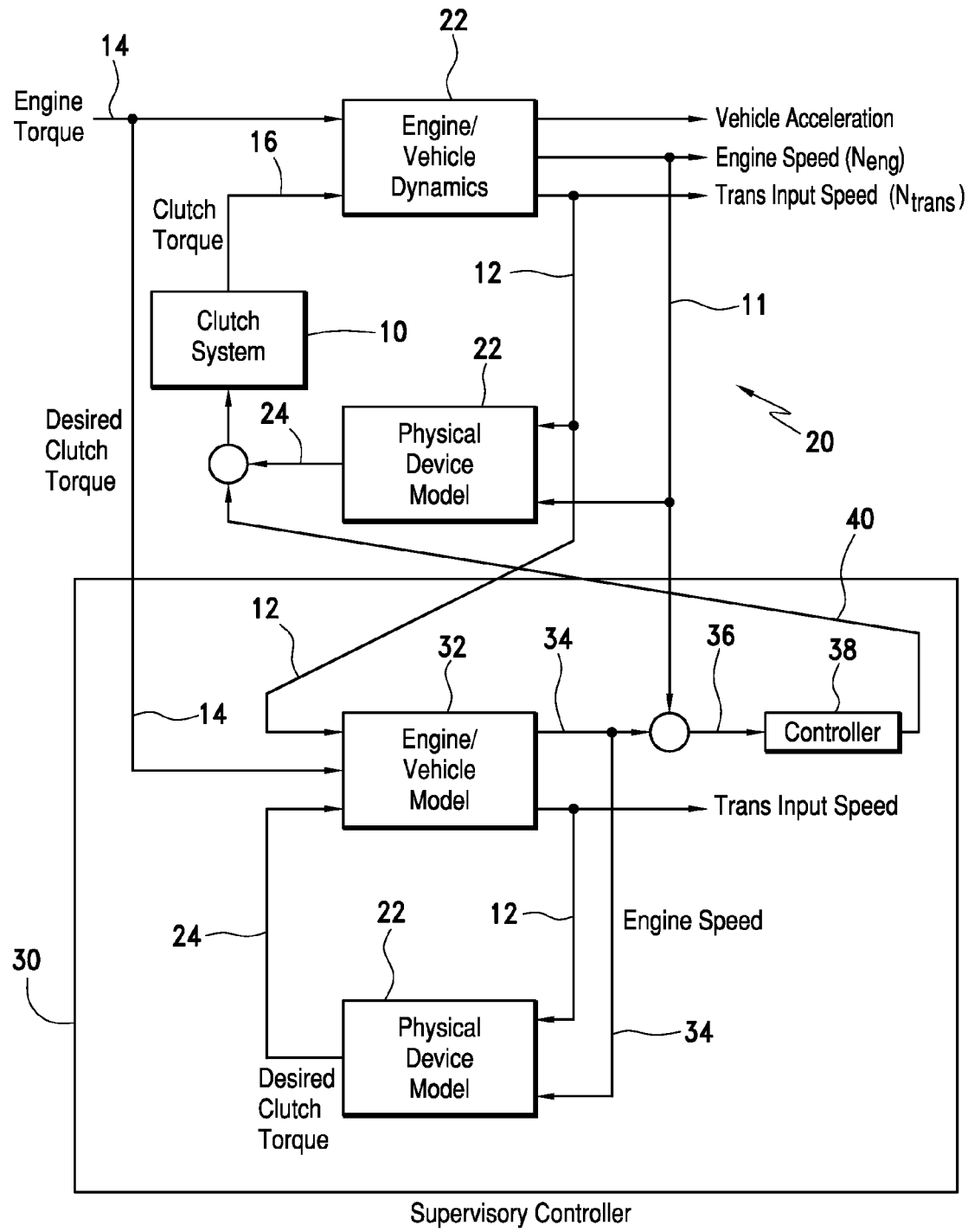
FIG. 5 is schematic block diagram of a supervisory control use in launch control of the vehicle.

The control system of FIGS. 4 and 5 receive as input a signal representing the current engine torque 14. The engine torque signal is produced from an engine torque map 9 in response to the extent to which an accelerator pedal 11 is displaced.

Figure 2:
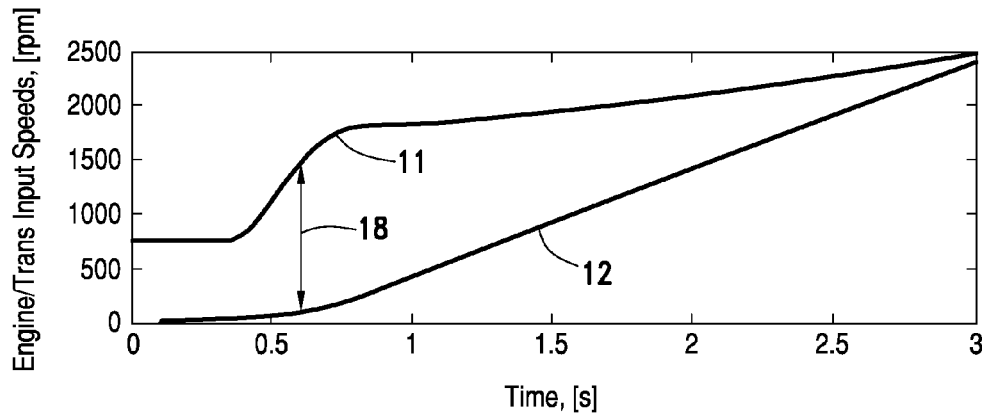
FIG. 2 is a graph showing the variation of engine speed and transmission input speed during a vehicle launch.
Figure 3:
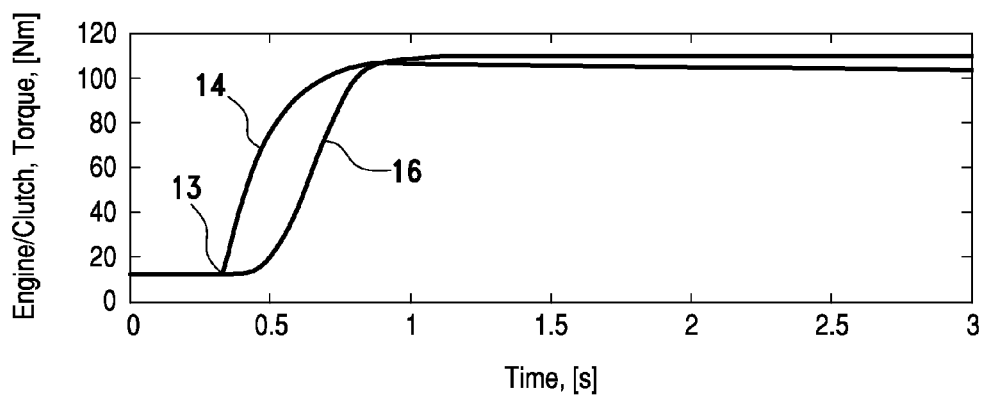
FIG. 3 is a graph showing the variation of engine torque and transmission input torque during a vehicle launch.

FIG. 2 shows the variation of engine speed 11 and transmission input speed 12 during a typical launch event. FIG. 3 shows the variation of engine torque 14 and transmission input shaft torque 16 during the launch event.

After the driver depresses the accelerator pedal 11, at 13, engine torque 14 increases with a resulting increase in engine speed 11. As slip 18 across the clutch 10 increases, the torque transmitting capacity of the clutch 10 increases in response, bringing the engine speed 11 into a quasi-equilibrium state and providing propulsion torque to the wheels 6, 7. Ultimately the engine speed 11 converges sufficiently close to the input shaft speed 12 that the launch event is considered complete, and the transmission and clutch controls enter a new state of operation.

FIG. 4 illustrates a block diagram of a system 20 for controlling clutch 10, in which software for controlling the clutch contains a mathematical model 22 of a physical device, such as a torque converter, fluid coupler, or centrifugal clutch. Model 22 emulates performance of the modeled device's torque response and uses clutch 10 as a slave actuator.

Engine speed 11 and transmission input speed 12 are measured and supplied as input to the physical device model 22, which produces a clutch torque command 24. A servo for actuating clutch 10 responds to command 24 by producing the clutch torque capacity corresponding to command 24.

The system operates closed-loop and can be analyzed using conventional closed-loop system design methods. However, the controller 20 in this form is not a tracking controller, i.e., it does not attempt to track a target engine speed or target wheel torque. Instead, wheel torque response and engine speed trajectory during the vehicle launch are tuned by adjusting the characteristics of the model 22 of the passive device and adjusting the software that controls engine torque 14 in response to driver inputs and the vehicle state.

Two possible physical device models 22 are detailed in Equations (1) and (2). Equation (1) models a viscous damper whose desired torque is simply proportional to the slip across clutch 10:

$$\tau_{desired} = k(N_{eng} - N_{trans}) \quad (1)$$

Here, $\tau_{desired}$ is the desired clutch torque, $N_{eng}$ is engine speed 11, $N_{trans}$ is transmission input shaft speed 12, and k is an adjustable proportionality constant.

Equation (2) models a fluid coupler that behaves like a torque converter operating above its coupling point:

$$\tau_{desired} = \frac{N_{eng}^2}{R^2}, \quad R = \Im(N_{eng}/N_{trans}) \quad (2)$$

Here, R is the capacity factor, a function of the ratio of engine speed 11 and transmission input shaft speed 12. This function, R the capacity factor, can be determined from a polynomial, a table, or other means indexed by $N_{eng}$ and $N_{trans}$.

Launch performance can be improved in some vehicle systems if different physical device models are chosen according to driver accelerator pedal position. This can be accomplished in the Equation 1 and 2 settings by adjusting proportionality constant k (Equation 1) or capacity factor R (Equation 2) as a function of pedal position.

It is important to note that some physical devices cannot be fully modeled by this method, because a clutch produces the same torque (with opposing direction) on both its input and output shafts, but a device such as a torque converter can provide torque multiplication from its input to its output.

The engine dynamic characteristics and vehicle dynamic characteristics 26, such as mass and inertia, road conditions including road grade and friction, and operating conditions including altitude, determine the engine speed 10 and vehicle acceleration rate 28 during the launch. Model 22 includes checks to ensure that if the depressed position of accelerator pedal 11 is decreasing, the desired clutch torque 16 is not increasing.

A major benefit of this method of clutch control is that clutch torque 16 is responsive to engine speed 11 rather than being responsive to an engine speed error with respect to an engine speed target. This means that clutch 10, like a torque converter or coupler, will not start to produce torque until the engine speed 11 responds to an engine torque increase 14. Therefore, the clutch 10 is not prone to stalling the engine should the engine hesitate during cold operation or when operating on degraded fuel. Similarly, with a properly designed device model 22, clutch torque 16 will find equilibrium with the engine torque 14 regardless of any torque error associated with the engine controls. For instance, engine torque capacity is significantly degraded at high altitude. If the engine controls do not properly account for altitude variation, the clutch torque response and vehicle launch behavior will remain well controlled, because they do not depend on engine torque estimation.

While this method is robust to engine torque errors, clutch torque errors, such as when the clutch system 10 produces the wrong torque as compared to the requested clutch torque, can lead to excessive clutch slip 18. For instance, if clutch 10 produces only one-half of the requested clutch torque 16, the slip 18 across clutch 10 must increase sufficiently to double the clutch torque request so that the actual clutch torque 16 properly balances engine torque 14. This increase in clutch slip 18 can lead to unwanted clutch wear.

To address this concern, a supervisory controller 30 can be constructed as shown in FIG. 5. Here, a model of the engine/vehicle dynamics 32 is run in parallel with control system 20. The engine/vehicle dynamics model 32 predicts the response of an idealized launch event using an estimate of engine torque 14 and actual transmission input shaft speed 12 as its inputs. The resulting modeled engine speed 34 is then compared to the actual measured engine speed 11, and the difference 36 is used by a controller 38 to determine a correction 40 to the desired clutch system torque request 24 using a control law.

A typical control law would employ an integral of the error 36, tuned to provide correction of the clutch system torque 16 gently enough to avoid unwanted torque disturbances at the vehicle wheels. Note that the physical device model 22 used in the launch control system 20 is reproduced in the system model inside the supervisory controller 32. Also, using the measured transmission input shaft speed 12 as another input to the supervisory vehicle model 30 insures that the modeled vehicle dynamics are unaffected by changes in road grade or vehicle mass, or a combination of grade and mass.

Figure 6:
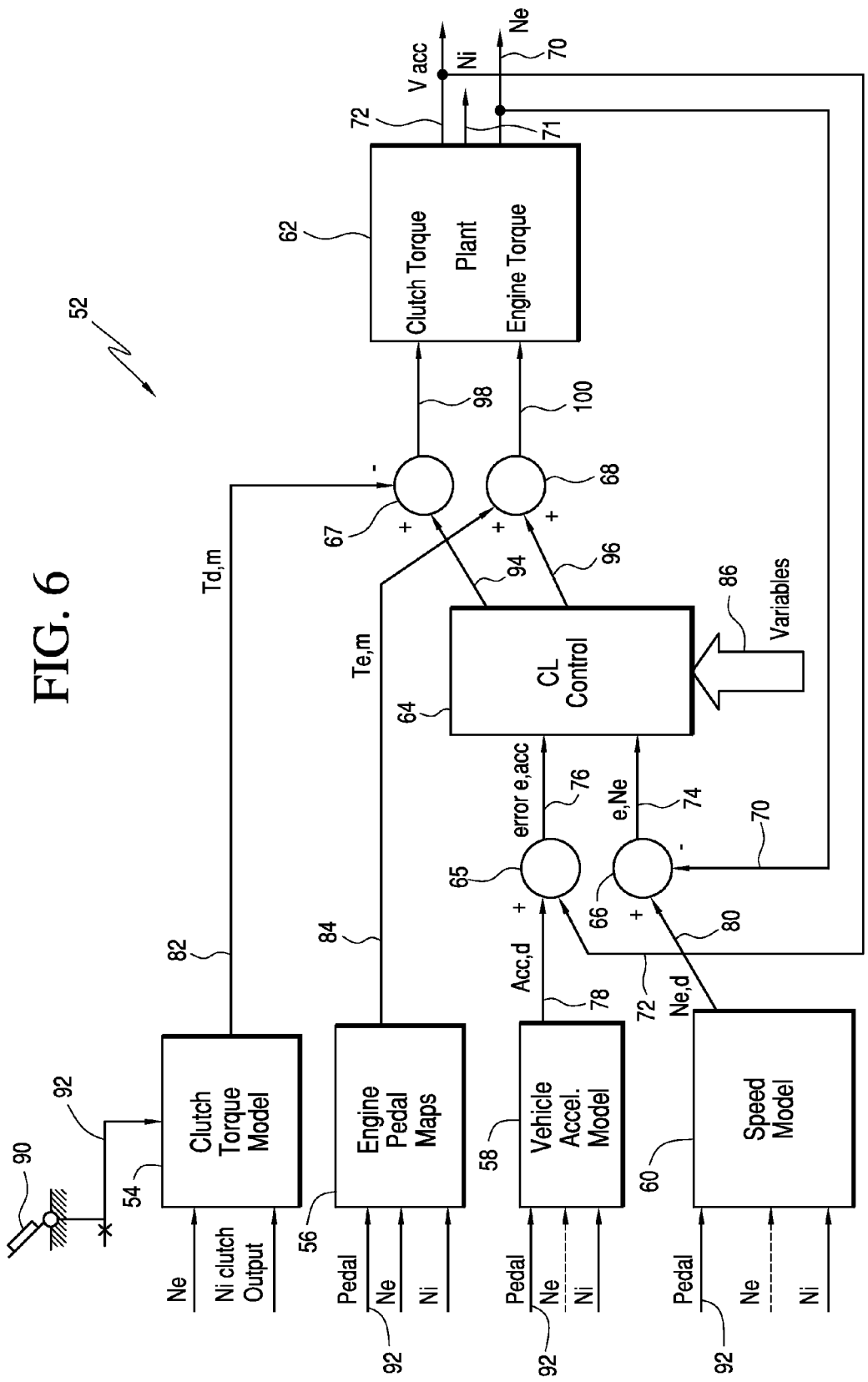
FIG. 6 is schematic block diagram of a system for controlling a motor vehicle powertrain, such as that of FIG. 1.

To provide a vehicle launch behavior that is consistent with conventional transmissions, clutch 10 is controlled during the launch event such that it emulates the behavior of a passive transmission input device, such as a torque converter, viscous coupling, etc. FIG. 6 illustrates a controller 52 for controlling input clutch 10.

The controller 52 includes various mathematical models: a clutch torque model 54; engine and accelerator pedal maps 56; a vehicle acceleration model 58, engine speed model 60; a closed loop controller 64, such as a PID controller; and summing junctions 65, 65, 66, 67. The plant 62 is the engine 2 and clutch 10 that are being controlled during the vehicle launch event.

Controller 52 includes three parts: (1) generation of the desired vehicle acceleration 78 and desired engine speed 80 using models 58 and 60, respectively; (2) a closed loop part that operates on (i) the error 74 between the actual engine speed 70 produced by plant 62 and the desired engine speed 80 from model 60, and (ii) the error 76 between the actual vehicle acceleration 72 produced by plant 62 and the desired vehicle acceleration 78 from model 58; and (3) generation of open-loop or feed-forward controls: desired clutch torque 82 and desired engine torque 84.

The open-loop or feed-forward desired clutch torque 82 is determined from a clutch torque model 54, preferably stored electronically in a look-up table, the model being a function of engine speed Ne and the speed of transmission input 8. The open-loop desired engine torque 84 is determined from a engine torque model 56, also stored electronically in a look-up table, the model being a function of engine speed Ne, pedal position 92 and the speed of transmission input 8. The desired vehicle acceleration 78 is determined from the vehicle acceleration model 58, which is a function of engine speed Ne, pedal position 92 and the speed of transmission input 8. The desired engine speed 80 is determined from the engine speed model 60, which is a function of engine speed Ne, pedal position 92 and the speed of transmission input 8.

The nominal model and the open-loop part can contain feedback aspects, e.g., engine mapping torque Te, m scheduling based on engine speed Ne. This type of feedback is called "structural feedback" to distinguish it from the closed-loop control feedback based on an explicit error calculation. In some cases structural feedback may be based on slow or heavily filtered variables, such as vehicle speed VS.

Considerable flexibility is available in choosing the nominal models. One possibility is to use only "open-loop" controls, i.e., models 54, 56, and tailor the engine torque model 56 according to non-electronic throttle control engine "cross-sectional" maps where the accelerator pedal 90 is mechanically, rigidly connected to the engine throttle plate. The clutch torque model 54 produces desired wheel torque as a function of transmission input speed Ni, engine speed Ne and pedal position 92. Since engine mapping is fixed and determined by non-launch conditions, this mapping technique is essentially one degree-of-freedom (DOF), i.e. clutch control-based open-loop, the open-loop part being in the form of a structural feedback.

A one DOF control can be deployed with clutch-control only reinforced with closed-loop controls that ensure repeatability and robustness in view of model and vehicle uncertainties and changes. In this case, clutch torque model 54, vehicle acceleration model 58 and engine speed model 60, on the one hand and models 54 and 58 on the other hand, are synchronized to emulate behavior of different coupling devices 10, such as a linear viscous coupling, fluid coupling or torque converter.

In the case of a vehicle launch control that emulates performance of a viscous coupling, the open-loop portion of the clutch torque model 54 is set forth in the equation $$\tau = k_1(N_e - N_i) \tag{1}$$

wherein the desired clutch torque T is proportional to the slip across clutch 10, $N_e$ is engine speed and $N_i$ is transmission input speed. This can be further extended to a more general form $$\tau = k_1[N_e - (k_2 N_i + k_3 N_{idle})] \tag{2}$$

wherein typically, $k_3=1$. The intent of this expression is to prevent engine loading below the engine idle speed $N_{idle}$ and to follow the desired vehicle speed, or its equivalent $N_i$ with some desired slope governed by $k_2$.

For the case in which a fluid coupling is emulated, instead of the above linear relations, the quadratic relation among the clutch torque, engine speed and transmission input speed can be imposed.

On a more general level, it is possible to prescribe any desired vehicle acceleration and engine speed behavior in models 58, 60, respectively, as a function of vehicle speed VS or transmission input speed Ni, which is proportional to vehicle speed. In this two DOF approach, both attributes, vehicle acceleration 70 and engine speed Ne, are prescribed within some physical limits.

The two key output components or attributes of the plant 62 that influence the quality of the vehicle launch are the desired or modeled engine speed 80 and desired or modeled vehicle acceleration 78 (or the closely related wheel torque). The vehicle acceleration model 58 produces as output desired vehicle accelerations for a vehicle launch event empirically determined with reference to accelerator pedal position PP 92, engine speed Ne and the speed Ni of transmission input 8. Similarly, the engine and clutch speed model 60 produces as output desired engine speeds for a vehicle launch event determined empirically with reference to accelerator pedal position PP 92, engine speed Ne and the speed Ni of transmission input 8.

In the form of an Input-Output matrix transfer function, the closed loop controller 64 employs both the engine 2 and clutch 10 to control plant 62 output attributes: engine speed Ne 70 and vehicle acceleration 72.

Summing junction 65 produces a vehicle acceleration error (e, acc) 76 representing the difference between the current vehicle acceleration 72 produced by the plant 62 and the desired vehicle acceleration 78 produced as output from vehicle acceleration model 78. Summing junction 66 produces a vehicle speed error (e, Ne) 74 representing the difference between the current vehicle speed 70 produced by the plant 62 and the desired vehicle speed 80 produced as output from vehicle speed model 60.

The closed loop controller 64, preferably a PID controller, is supplied with data 86 representing information, such as ambient temperature, barometric pressure and road grade, required to determine the current engine output torque commanded by the vehicle operator. The closed loop controller 64 uses errors 74 and 76 and data 86 to produce (i) a signal 94 representing a change in commanded clutch torque to be produced by clutch 10, and (ii) a signal 96 representing a change in commanded engine torque to be produced by engine 2.

At summing junction 67, the feed-forward signal 82, representing desired clutch torque, and the feedback signal 94, representing the change in commanded clutch torque, are combined algebraically to produce a signal 98 representing a new or updated commanded clutch torque 52. Preferably signal 98 is converted to a signal that is applied to a solenoid that controls the magnitude of pressure applied to the servos that control the variable magnitude of torque capacity to be transmitted by clutch 10.

Similarly, at summing junction 68, the feed-forward signal 84, representing desired engine torque, and the feedback signal 96, representing the change in commanded clutch torque, are combined algebraically to produce a signal 100 representing a new or updated engine torque to be produced by engine 2.

Figure 7:
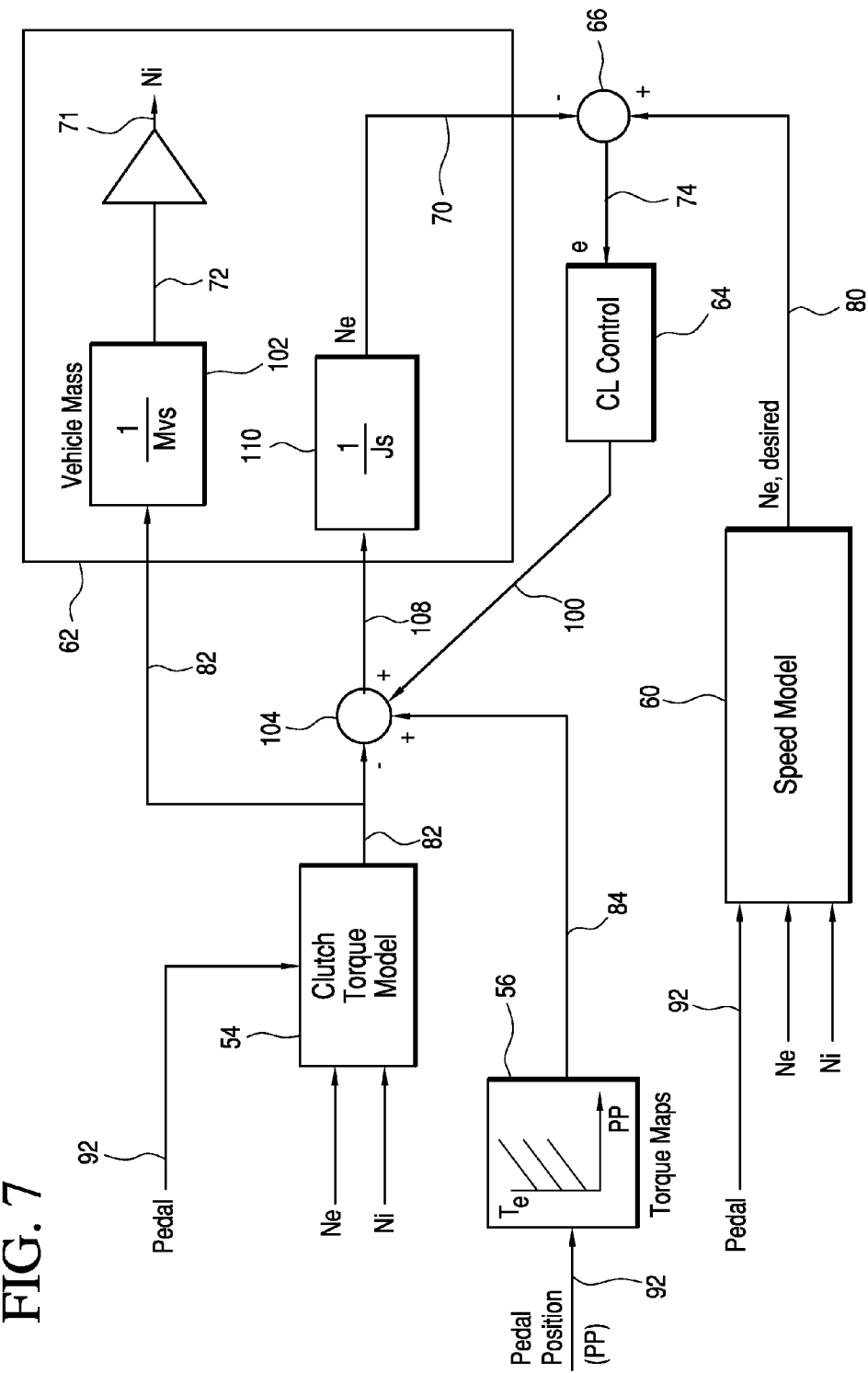
FIG. 7 is schematic block diagram showing the interaction of the plant with the math models of FIG. 2.

FIG. 7 illustrates application of control signals and output of the math models described with reference to FIG. 6 to the controlled engine and clutch plant 62.

The open loop, feed-forward desired or modeled clutch torque 82, determined from clutch engine torque map 54 with reference to accelerator pedal position PP 52, engine speed Ne and the speed Ni of transmission input 8, is supplied as input to clutch 10 of the plant 62. At 102, the desired clutch torque 82 or updated clutch torque 98 operates on the vehicle mass Ms to produce the current vehicle acceleration 72 during the vehicle launch event. The current vehicle acceleration is integrated to produce a current vehicle speed 71 during the launch event.

Desired engine torque 84, determined from engine torque map 56 with reference to accelerator pedal position PP 92 and at least one of the speed of engine 2 and the speed of input 8, is supplied as input to summing junction 104.

Similarly, the engine speed model 60 processes current accelerator pedal position PP 92, engine speed Ne and transmission input speed Ni to produce the desired engine speed Ne 80, which is supplied as input to summing junction 66. The engine speed error signal 74 is supplied to closed loop controller 64.

At summing junction 104, the output of summing junction 68, which is the change in engine torque 96, 100, is combined algebraically with desired clutch torque 82 and desired engine torque 84 producing a signal representing the torque 108 used to accelerate rotating components upstream of clutch 10. At 110, torque 108 is applied to the rotational inertial J of the rotating components upstream of clutch 10, principally the mass moment of inertia of engine 2 and driveshaft 3, producing the current engine acceleration, which is integrated to produce the current speed 70 of the engine 2 and driveshaft 3.

Closed-loop implementation requires adequate sensors are available for key measured variables including engine speed. But other relevant variables including wheel torque or vehicle acceleration are not always available and can be estimated based on physical models. Of course, if reliable low-cost wheel torque sensors become available they could be used to further enhance the launch control method.

The invention claimed is:

1. A method for controlling a clutch during a vehicle launch comprising:
   (a) determing commanded clutch torque and commanded engine torque using respective errors between vehicle acceleration and desired vehicle acceleration, and between engine speed and desired engine speed;
   (b) changing clutch capacity to a sum of desired clutch torque and the commanded clutch torque;
   (c) changing engine torque to a sum of desired engine torque and the commanded engine torque.

2. The method of claim 1, further comprising:
   using a current accelerator pedal position, engine speed, and transmission input speed to determine a desired clutch torque, a desired engine torque, a desired vehicle acceleration and a desired engine speed.

3. The method of claim 1, wherein step (a) further comprises:
   determining a first error between the desired vehicle acceleration and a current vehicle acceleration;
   using the first error and current vehicle operating conditions to determine a change in clutch torque that minimizes the first error.

4. The method of claim 1, wherein step (a) further comprises:
   determining a second error between the desired engine speed and a current engine speed;
   using the second error and vehicle operating conditions to determine a change in engine torque that minimizes the second error.

5. The method of claim 1, wherein step (a) further comprises:
   determining a first error between the desired vehicle acceleration and a current vehicle acceleration;
   determining a second error between the desired engine speed and a current engine speed; and
   using the first and second errors and current vehicle operating conditions to determine a change in clutch torque and a change in engine torque that minimizes the first and second errors.

6. The method of claim 1, wherein step (a) further comprises:
   determining the desired clutch torque that emulates performance of one of a viscous coupling, a hydraulic torque converter and a hydraulic coupling.

7. A method for controlling a transmission input clutch during a vehicle launch comprising the steps of:
   (a) using open loop control to determine a desired clutch torque, a desired engine torque, a desired vehicle acceleration and a desired engine speed;
   (b) determining a first error between the desired vehicle acceleration and current vehicle acceleration;
   (c) determining a second error between the desired engine speed and current engine speed;
   (d) using closed loop control to determining a commanded clutch torque and a commanded engine torque with reference to the first and second errors;
   (e) applying to the clutch an updated clutch torque capacity whose magnitude is the sum of the desired clutch torque and the commanded clutch torque; and
   (f) producing an updated engine torque whose magnitude is the sum of the desired engine torque and the commanded engine torque.

8. The method of claim 7, wherein step (a) further comprises:
   determining the desired clutch torque that emulates performance of one of a viscous coupling, a hydraulic torque converter and a hydraulic coupling.

9. The method of claim 7, wherein step (a) further comprises:
   using current accelerator pedal position, engine speed, and transmission input speed to determine desired clutch torque, desired engine torque, desired vehicle acceleration and desired engine speed.

10. The method of claim 7, wherein step (d) further comprises:
    using the first error and current vehicle operating conditions to determine a change in clutch torque that minimizes the first error.

11. The method of claim 7, wherein step (d) further comprises:
   using the second error and current vehicle operating conditions to determine a change in engine torque that minimizes the second error.

12. The method of claim 7, wherein step (d) further comprises:
   using the first and second errors and current vehicle operating conditions to determine a change in clutch torque and a change in engine torque that minimizes the first and second errors.

13. A method for controlling a transmission input clutch during a vehicle launch comprising the steps of:
   (a) using open loop control to determine a desired clutch torque, a desired engine torque, a desired vehicle acceleration and a desired engine speed;
   (b) determining a first error between the desired vehicle acceleration and a current vehicle acceleration;
   (c) determining a second error between the desired engine speed and a current engine speed;
   (d) using closed loop control to determining a commanded clutch torque and a commanded engine torque with reference to the first and second errors;
   (e) applying to the clutch an updated clutch torque capacity whose magnitude is the sum of the desired clutch torque and the commanded clutch torque; and
   (f) producing an updated engine torque whose magnitude is the sum of the desired engine torque and the commanded engine torque;
   (g) determining the desired clutch torque that emulates performance of one of a viscous coupling, a hydraulic torque converter and a hydraulic coupling.

* * * * *